United States Patent [19]

Seaborne

[11] Patent Number: 4,513,766

[45] Date of Patent: Apr. 30, 1985

[54] VACUUM PULSATOR VALVES

[76] Inventor: Thomas L. Seaborne, 10 Collier Crescent, Brunswick, Victoria, Australia

[21] Appl. No.: 630,349

[22] Filed: Jul. 16, 1984

Related U.S. Application Data

[63] Continuation of Ser. No. 349,153, Feb. 16, 1982.

[30] Foreign Application Priority Data

Feb. 13, 1981 [AU] Australia .................. 7594/81

[51] Int. Cl.$^3$ ............................................. A01J 5/12
[52] U.S. Cl. .............................. 137/103; 137/DIG. 8
[58] Field of Search ................ 137/103, DIG. 8

[56] References Cited

U.S. PATENT DOCUMENTS

| 2,237,441 | 4/1941 | McCornack | 137/103 |
| 2,313,822 | 3/1943 | Hapgood | 137/103 |
| 2,652,847 | 9/1953 | Segebarth | 137/103 |

FOREIGN PATENT DOCUMENTS

214498  2/1958  Australia ................ 137/103

Primary Examiner—Martin P. Schwadron
Assistant Examiner—James R. Shay
Attorney, Agent, or Firm—Banner, Birch, McKie & Beckett

[57] ABSTRACT

A vacuum pulsator for milking machines comprises a pair of valves controlling the alternate application of vacuum and air pressure in a line connected to the pulsator, the pulsator including adjustable bleed valves operative to control the frequency of alternation and/or the phase length of alternation of vacuum and air pressure. The pulsator may be subject to compressed air or atmospheric air, and the bleed valves are adjustable externally of the pulsator body.

26 Claims, 13 Drawing Figures

VACUUM PULSATOR VALVES

This is a continuation of application Ser. No. 349,153, filed Feb. 16, 1982.

The invention relates to vacuum operated pulsator valves for use with milking machines adapted to be wholly automatic in use.

To assist in the understanding of the present invention the various types of pulsators commonly used will be defined.
1. MASTER AND SLAVE PULSATOR
2. AUTOMATIC PULSATOR
3. RELAY PULSATOR
4. PULSATOR TYPES: REVERSING. NON-REVERSING.

Master and Slave pulsation indicates that all bail pulsators receive and are driven by the actuating vacuum/air pulse generally supplied from a mechanical master pulsator driven from the vacuum pump. In this system the air demand is balanced by having the pulsators operating in opposing banks of units so that when one bank is on vacuum the other is on air. This is accomplished by the use of a reversing pulsator, or pulsators installed at intervals, or by direct linkage from the master pulsator.

Automatic pulsators do not require a master. Initially they are basically designed to produce, at requisite mercury levels a defined pulse, the rate or speed of which is either fixed or adjustable by controlling the volume interchange to a timing chamber of the vacuum/air phases produced by the pulsator. Present type automatic pulsators have a less stabilizing effect on air line vacuum as having no master control, all pulsators operate more or less at random. Broadly automatic pulsators fall into two types:

(i) Those pulsators designed to produce purely pneumatically at requisite mercury levels a defined ratio of pulsation of vacuum to atmospheric pressure, the rate or speed of the said pulsation being regulated by the controlled interchange to a timing or actuating chamber, either by fixed jet or adjustable valvular means of the vacuum/air phases produced by pulsator action.

(ii) Those developed on the so-called windscreen wiper principle combining both pneumatic and mechanical features. These are based on pneumatically operated opposing diaphragms which alternatively and mechanically actuate a spring loaded plastic slide switch-—over arrangement which in turn controls the admittance of vacuum or atmosphere to the opposing diaphragms and also to the slide controlled ports giving access to and the resultant pulse to the teat cups.

Both in construction and performance these pulsators are more or less stereotyped and none are capable of performing other than the fixed role in milking machine pulsation for which they were designed.

Relay pulsation on milking machines is defined as where the first bail pulsator receives its actuating pulse direct from a "Master" and then in turn relays the pulse received to the next pulsator and so on. This means that the vacuum/air phases "ripple" along the air-line in a cascade mode thus stabilising the vacuum variation in the line to a greater extent than the balance effect of Master and Slave pulsation.

Pulsator types; Reversing and non-reversing.

The reversing pulsator is so called because it delivers the opposite pulse to that received, i.e.: upon receiving an air pulse to its actuating chamber it delivers a vacuum pulse to the teat cups and in relay pulsation—also to the next pulsator and vice versa.

The non-reversing pulsator upon receiving an air pulse, delivers an air pulse and vice versa.

In all known pneumatic relay pulsators controlled by an automatic master the passing of pulsation phases one to the other has only been effectively accomplished when the pulses passed were of an equal ratio. In the circumstances where a master or a relay pulsator produces an operating pulse where the vacuum phase is greater than that of atmospheric pressure such as a vacuum/air ratio of 60:40, then this pulse would, if passed directly to the actuating chamber of the next pulsator, produce to the connected teat cups of that pulsator the reversed vacuum/air ratio of 40:60.

There is no known milking machine valve capable of correcting this effect and enabling in such pulsation the passing one to the other of any desired constant ratio.

This invention relates to both reversing and non-reversing type vacuum operated pulsator valves for use with milking machines adapted to be wholly automatic in use. Preferably the invention will be described with reference to a reversing type pulsator i.e.: a pulsator which on receiving an air pulse to its timing or to its actuating chamber, produces an ensuing vacuum pulse to its attached teat cups and vice versa.

It is the principal objective of the invention to provide specific valvular means whereby a milking machine pulsator as described can be made readily adjustable to any ratio in both the automatic and relay mode.

Figure 1:
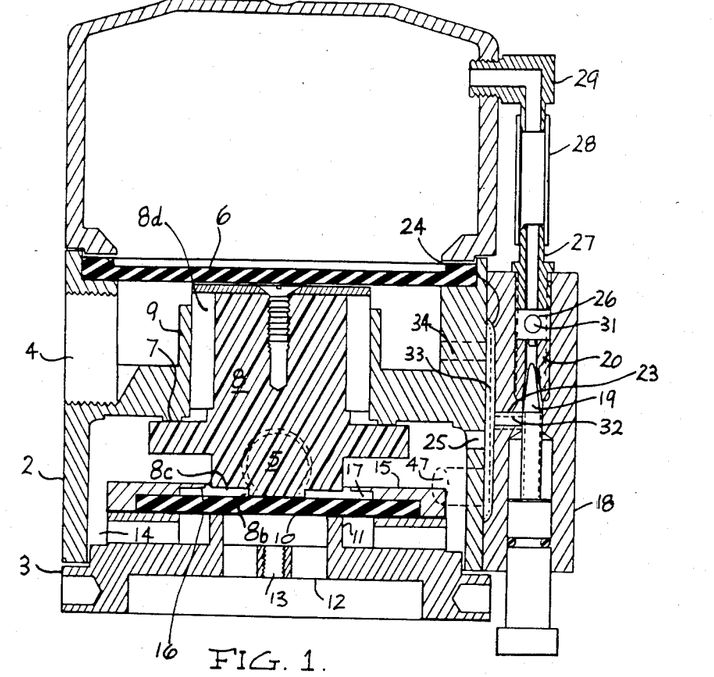
FIG. 1 is a sectional view of a master pulsator taken on line II—II of FIG. 2.
Figure 2:
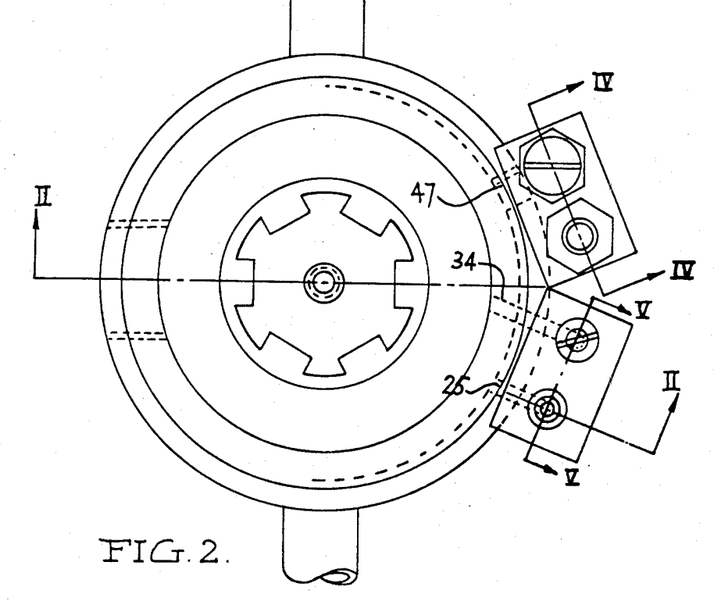
FIG. 2 is a plan view of FIG. 1.
Figure 7:
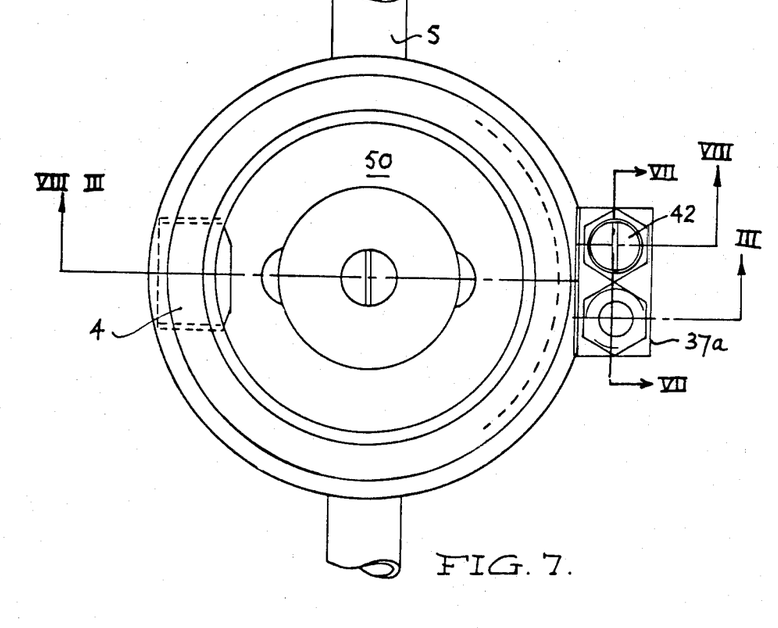
FIG. 7 is a plan view of a relay pulsator.

It is also an object of the invention to provide by the indicated means:
1. an automatic unit operating as a milking medium direct to teat cups. FIG. 1.
2. A master or control pulsator for operating a plurality of slave pulsators transmitting any desired pulsation ratio.
3. A master pulsator as in the preceding paragraph having attached the relay valvular means to initiate a control pulse to pulsators operating in the ripple mode. (See FIG. 2 of accompanying drawings).
4. A relay pulsator subject to master control. (See FIGS. 3, 7 and 8 of accompanying drawings).
5. An automatic pulsator which may have combined externally mounted rate and ratio control valves. (See FIGS. 1 and 5 of accompanying drawings).
6. An automatic pulsator which may have separately mounted rate and ratio control valves by eliminating the channel 31, removing the plug in channel 30 and replacing with connections similar to 27, 28 and 29 to the chamber 1. (See FIG. 1 of the accompanying drawings).
7. A pulsator providing means to allow non-synchronous valve action movement. Nos. 8 and 15 in FIG. 1 of the accompanying drawings).
8. A pulsator providing timing chambers as required which have external access to the vacuum/air pulses received via the flexibly connected valvular means.

It is also an objective of the invention to provide:
a relay pulsator valve having incorporated or attached similar adjustable valvular means as in the preceding paragraph for readily adjusting in step or out-of-step pulsation ratios to any desired constant ratio (see FIGS. 3 to 8 of the accompanying drawings).;
a pulsator valve as in the preceding paragraph also designed to act as a versatile reversing or balancing pulsator between those opposing banks of pulsators that are so disposed in master and slave pulsation operated milking machines in order to balance air demand;

a highly efficient slave pulsator suitable for either mechanical or automatic master control;

the pulsator valve as in preceding paragraphs eminently suitable for use with compressed air in lieu of atmospheric air as the pressure medium to the teat cups;

valvular means as described (see FIG. 4) which may be used independently as a means of converting other types of slave or relay pulsators to any desired ratio of pulsation.

According to the present invention there is provided a vacuum pulsator adapted to supply pulses of vacuum alternately with pulses of atmospheric or compressed air, said pulsator comprising a body including means for connecting a first zone of said body to a permanent vacuum source and a diaphragm valve comprising a first valve element cooperating with a first valve seat adapted to connect a second zone of said body to a source of atmospheric or compressed air, said body further including a second valve seat adapted to be opened or closed to establish or prevent communication between said first and second zone, said body further housing a first deformable diaphragm having first and second opposed surfaces with said first surface arranged for exposure to said permanent vacuum source and cooperating with said first valve element whereby said first valve element is movable such that when said second valve seat is closed, said first valve seat is open thereby applying atmospheric or compressed air to said second zone, and when said second valve seat is open, said first valve seat is closed thereby applying vacuum to said second zone, the movement of said first deformable diaphragm and said first valve element being controlled by an adjustable ratio control valve means communicating either atmospheric air or said first zone to the second surface of said first deformable diaphragm to control the ratio of vacuum/atmospheric or compressed air pulses appearing in said second zone.

According to a second aspect of the present invention there is provided a vacuum pulsator adapted to supply pulses of vacuum alternately with non-vacuum pulses, said pulsator comprising a body including means for connecting a first zone of said body to a permanent vacuum source and a diaphragm valve comprising a first valve element cooperating with a first valve seat adapted to connect a second zone of said body to a non-vacuum source of air, said body further including a second valve seat adapted to be opened or closed to establish or prevent communication between said first and second zones, said body further housing a first deformable diaphragm having first and second opposed surfaces with said first surface arranged for exposure to said permanent vacuum source and cooperating with said first valve element whereby said first valve element is movable such that when said second valve seat is closed, said first valve seat is open thereby applying atmospheric or compressed air to said second zone, and when said second valve seat is open, said first valve seat is closed thereby applying vacuum to said second zone, and relay valve control means arranged to communicate the second zone of said pulsator with the second surface of said first deformable diaphragm of an adjacent pulsator, said communication occurring via a non return valve and an adjustable valve means arranged in parallel flow relation.

The invention will be described in greater detail having reference to the accompanying drawings in which.

The timing chamber 1, is cylindrical in shape and has an external nozzle 29, giving connection to the vacuum-/air phases controlled by the rate adjusting needle valve 19, and the ratio adjusting needle valve 21.

The timing chamber 1 has a volume which communicates with the upper surface of a top (or operating) diaphragm (6) of a pulsator. The volume is relatively small in a "slave" or relay pulsator (FIGS. 3 and 8) compared with that of an "automatic" unit (FIG. 1). In this case the volume is relative in size to the bleed means supplying air and vacuum to the chamber to provide the "time delay" which allows the pulsator to become self operating. It is, in essence, an actuating chamber giving effect to the vacuum/air phases acting on the upper surface of the diaphragm (6).

The fabricated housing includes the timing chamber 1, a body 2, and base 3, having a permanent connection to vacuum 4, and a connection 5, to the milking machine teat cups.

A diaphragm 6, located in the section between the chamber 1 and body 2 and capable of being sealed by the timing chamber 1. An annular seat 7, and a pressure member 8, is interposed in the chamber between the connection to vacuum 4, and the connection to teat cups 5, and is slidable in the guide 9. The pressure member 8, is arranged to be in contact with both the diaphragm 6, and the central seating arrangement 7.

The lower section of the pressure member 8 also acts as a valve member in contact with a valve diaphragm 10 located in the base of the pulsator 3 functioning to operate immediately when the pressure member 8 is moved down under atmospheric pressure on the diaphragm 6 so as to prevent direct passage of atmospheric air to the vacuum connection during the changing phases of the pulsator from air, or from vacuum to the teat cups. The valve diaphragm 10 also co-acts with the seat 11 located in the base 3 for admitting atmospheric air to the teat cups through connection 5.

The base 3 is circular in shape and has four holes 12 arranged centrally to allow admittance of atmospheric air to the pulsator. Provision is made 13 for attachment of a suitable air filter. Alternatively the air admission holes 12 may be plugged off or omitted and replaced by a suitable connection giving the pulsator access to compressed air.

Around the holes 12 is arranged a ring or seat 11 and adjacent there-to are arranged metering holes 14 enabling atmospheric air to pass to the teat cups through connection 5. Sitting across the seat 11 is a valve diaphragm 10 held in place by a suitable fixed retaining plate 15 which has a central aperature 16 extending just clear of the outer periphery of the seat 11 allowing access to the contacting valve head of the pressure medium 8. Adjacent the aperature 16 the retaining plate has a circular recess 17. The object of this recess is to allow the valve diaphragm to have minimal or no clearance across the seat 11 so that the entry of atmospheric air to the pulsator under pulsation is only possible on the air phase to cups, thus creating a positive and leak proof pulsator under all conditions of operation.

When a vacuum phase pertains to the pulsator the recess 17 operates in conjunction with the projection 8b and the recess 8c of the pressure member 8 to give clearance across the seat 11, thus allowing atmospheric air to pass to the teat cups.

The pressure member 8 is of a particular shape, the guide stem 8a being fluted or grooved to both reduce friction and give free passage of atmospheric air via the fluted air passages 8d from teat cups to permanent vacuum.

The lower section which operates in permanent contact with the valve diaphragm 10 is stepped in shape having a circular projection 8b and a circular recess 8c.

The foregoing description refers to essentially a reversing pulsator incorporating generally well established design principles with the major exception of the sliding valve member 8 which together in co-operation with the diaphragms 6 and 10 controls atmospheric or compressed air entry to the pulsator. The sliding valve member 8 incorporates two seats—an upper seat acting with valve seat 7 to control the vacuum phase and a lower seat, which has a central projection 8b to control the air phase. The central projection 8b is in constant and positive contact at all times with a flexible diaphragm 10 controlling air entry through the valve seat 11. The valves 7 and 10, 11 are coupled through the sliding valve member 8 in such a way that each valve moves to the closed position before the other valve opens. The movement is a non-synchronous one such as to prevent both valves being open at the same time. This action is attained by the movement of the centre portion or projection 8b of the valve member 8, together with an air induced reaction of the enclosed diaphragm 10 controlling air entry which allows the upper valve of the member 8 to be seated before the lower valve 10, 11 leaves its seat. Similarly in the other direction, the initial movement of the sliding valve member 8 holds the lower valve 10, 11 closed as the upper seat 7 opens.

The action is further described in the following:

1. On atmosphere applied across the diaphragm 6 the resultant initial downward movement of the pressure member 8 causes the small projection 8b acting centrally on the valve diaphragm 10 to immediately close off atmospheric air across the seat 11. The further downward movement continues until stopped by the recess 8c acting across the seat 11 thus providing accurate opening of the seat 7 to permanent vacuum.
2. On vacuum applied across the diaphragm 6 atmospheric air entering through the holes 12 against the valve diaphragm 10 forces the pressure member 8 upwards to instantly close off permanent vacuum at the seat 7 and at the same time forces and distorts the valve diaphragm 10 around the projection 8b into the recess 8c and across into the recess 17 of the retaining plate 15 thus giving full clearance above the seat 11 and allowing atmospheric or compressed air to pass to the teat cups via the air metering holes 14 and connection to teat cups 5.

Figure 11A:
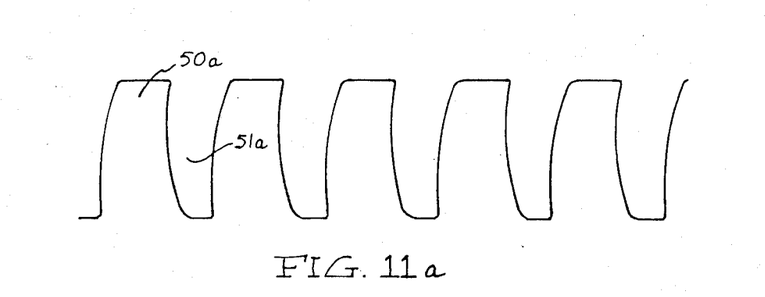
FIGS. 11a, 11b and 11c are graphs of different pulse cycles obtainable with the pulsator of the present invention.

The graph in FIG. 11a shows the inbuilt 60:40 pulse curve of the average automatic pulsator.

Figure 5:
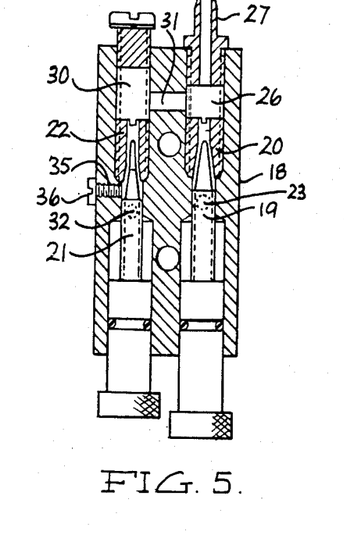
FIG. 5 is a sectional view taken on line V—V of FIG. 2.

Referring to FIG. 5 a housing 18 is externally and vertically attached to the body 2 preferably having a rate adjusting needle valve 19, its seat 20, a ratio adjusting needle valve 21 and its seat 22.

The rate adjusting needle valve 19 is connected via the duct 23, channel 24 and the duct 25 to the vacuum-/air phases of the pulsator and thence via the needle valve 19, the common chamber 26, nozzle 27, flexible tube 28 to the nozzle 29 directly connected to the timing chamber 1.

The function of the rate adjusting needle valve is to control the rate at which air passes to and from the timing chamber. The greater the opening the faster the pulsation rate. The smaller the opening the slower the pulsation rate.

The function of the ratio control valve is to enable variation of the pulse given by an automatic pulsator to any degree either side of 50:50 vacuum/air or to either side of the pre-determined given ratio of the pulsator. The vacuum/air ratio or pulse is initially controlled by the pressure change induced by a rate control valve or an adjustable jet metering the required passage of air to and from the timing chamber.

The ratio adjusting needle valve 21 (FIG. 5) is connected via the chamber 30, the duct 31, the common chamber 26 and thence via the nozzles 27 and 29 to the timing chamber 1. It also has connection via the duct 32 and channel 33 to permanent vacuum pertaining at the duct 34 (FIG. 1) or to atmosphere via the port 35 (FIG. 5) either of which may be alternatively plugged off by the removable plug 36 according to the particular ratio required. If a longer vacuum phase is required the removable plug 36 preventing the admission of atmospheric air through the port 35 is removed and inserted into the channel 34 connecting permanent vacuum via the ratio adjusting needle valve 21 to the timing chamber 1. This increases the length of the vacuum cycle whereas connection to permanent vacuum lengthens the pressure cycle of the pulsator.

The ratio needle valve is now opened to admit sufficient atmospheric air to the timing chamber 1 to give the required longer vacuum phase to the teat cups.

Figure 11B:
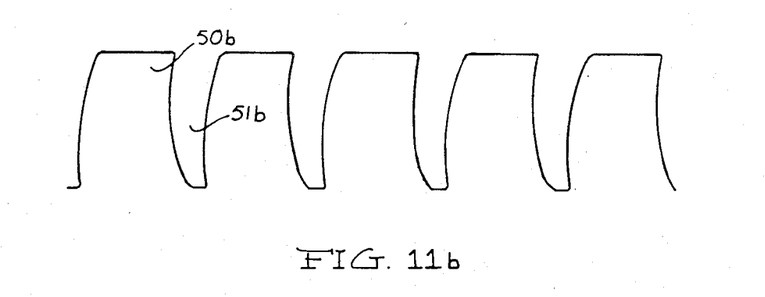

FIG. 11b shows the longer vacuum phase 50b as against the pressure phase 51b.

This is engendered by the extra time the vacuum bleed via the rate adjusting needle valve 19, the nozzles 27 and 29 to the timing chamber 1 takes to remove sufficient air to enable requisite vacuum to pertain in the timing chamber to facilitate the following air to cups phase.

To shorten the vacuum to cups phase atmospheric air is shut off by reversing the plug 36. The open duct 34 now gives an added vacuum bleed via the channel 33, duct 32, the adjusted ratio needle valve 21, chamber 30, duct 31, common chamber 26, nozzles 27 and 29, to the timing chamber 1. This in conjunction with the vacuum pertaining through the rate adjusting needle valve 19 to the timing chamber 1 causes vacuum to attain quickly in the timing chamber with resultant longer air phase to the teat cups.

Figure 11C:
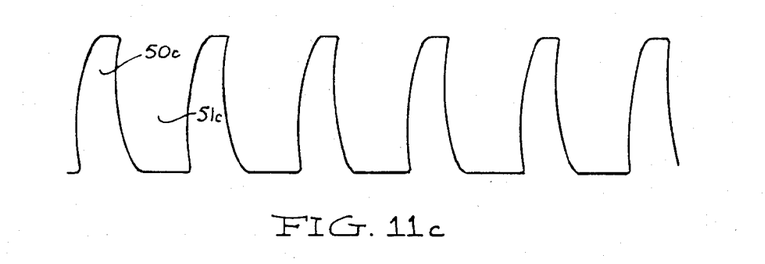

FIG. 11c shows the short vacuum phase 50c and the long pressure phase 51c.

With the plug 36 inserted into the port 35 and the ratio adjusting needle valve 21 closed, the standard ratio of the pulsator pertains.

Figure 6:
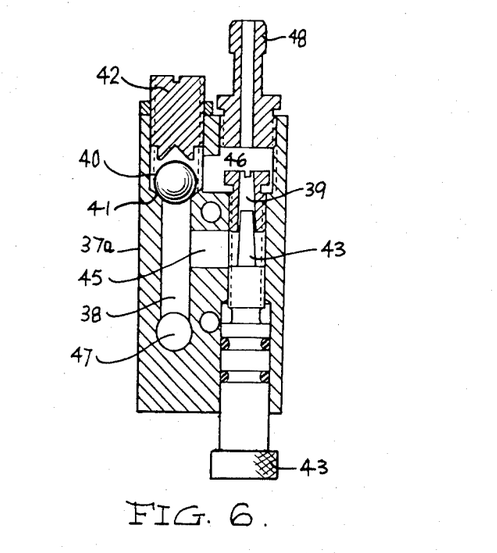
FIG. 6 is a sectional view of ratio adjusting mechanism taken on line VII—VII of FIG. 7.

When it is required that the pulsator as described, also or independently, act as a master pulsator transmitting or relaying a specific ratio of pulsation, the following valvular relay ratio adjustment means as shown in FIG. 6 are also suitably attached to the body 2.

Figure 4:
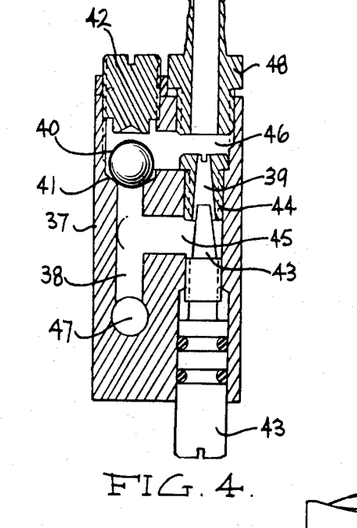
FIG. 4 is a sectional view taken on line IV—IV of FIG. 2.

The valve 37a shown in FIG. 6 is identical to the valve 37 shown at FIG. 4. There is no structural difference in the valves.

Figure 3:
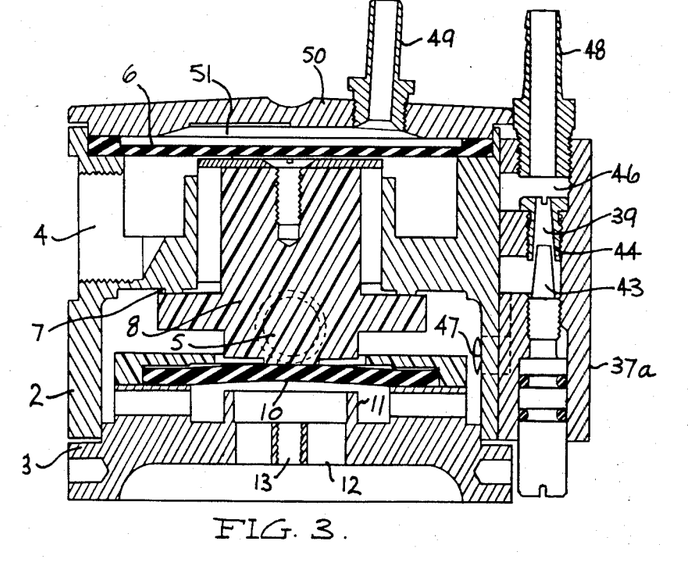
FIG. 3 is a sectional view of a relay pulsator taken on line III—III of FIG. 7.
Figure 8:
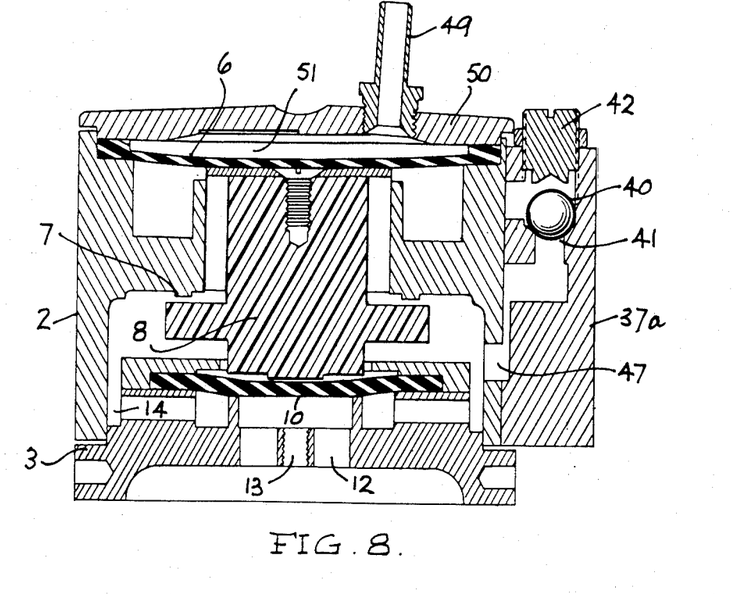
FIG. 8 is a sectional view of the relay pulsator taken on line VIII—VIII of FIG. 7.
Figure 9:
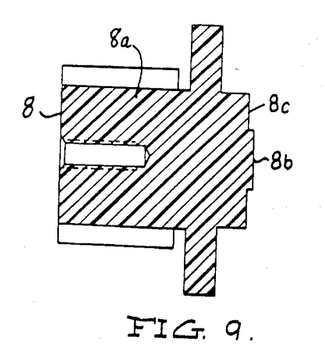
FIG. 9 is a sectional view of a pressure member taken on line IX—IX of FIG. 10.
Figure 10:
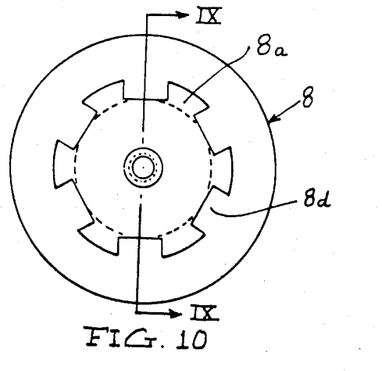
FIG. 10 is a plan view of a pressure member.

The relay pulsator operating in the relay mode is shown in FIGS. 3 and 8 with its attached relay ratio adjustment valve 37.

The function of the relay control valve or attachment 37 is to provide an unrestricted air flow in one direction only and to restrict and prolong the duration of the reverse air flow so that the pulse passed to the driven relay or driven pulsator can be corrected to provide the required ratio to the teat cups. This is facilitated by the given drive air pulse being able to pass freely via a one way valve and an adjustable valve jet to the cap or timing chamber of the driven relay. On reverse air flow the closure of the one way valve forces the returning air to pass entirely through the restricted adjustable valve jet causing this flow to be prolonged. The adjustment of the jet determines the time factor controlling both the ratio of the given air pulse and resultant vacuum/air pulse to cups, i.e., the greater the restriction, the longer the sustained air pulse to the timing chamber—giving longer vacuum stroke to cups. The greater the opening of the adjustable jet the shorter the vacuum stroke to the cups. This action allows continuous adjustment of ratio valves to either above or below 50:50 vacuum/air.

The valve housing 37 is preferably oblong in shape and is constructed with two main air passages 38 and 39. Passage 38 incorporates preferably a ball valve 40 and its seat 41. The upward movement of the ball is contained and controlled by the adjustable coned retaining screw 42.

Passage 39 incorporates and is controlled by preferably a needle valve 43 and its seat 44. Both passages are commonly interconnected via the channels 45 and 46 to both the vacuum and atmospheric air phases to the teat cups of its attached pulsator through the connection 47 and to the connecting nozzle 48 operating to the actuation chamber 51 (FIG. 8) to the next and driven pulsator.

When used in fixed relationship as a relay pulsator subject to master control it may also be used preferably as a driving unit transmitting a corrected pulse to the next pulsator or as a driven unit correcting and operating to the pulse received. In the latter usage the valve has no connection to the vacuum and atmospheric air phases of the pulsator to which it is attached. These are received from a suitable connection on the previous relaying pulsator and connected directly to an external nozzle on the valve housing 37 giving access to the passage 38. The pulse corrected by the valve passes via the nozzle 48 to the actuating chamber of its attached pulsator.

DESCRIPTION OF RELAY PULSATOR VALVE

FIGS. 3, 4, 6, 7 and 8.

The construction of the relay valve is identical to that of the automatic pulsator except that the rate and ratio valve is omitted, the timing chamber 1 is replaced by the pulsator cap 50 which has preferably a nozzle connection 49 giving access to the actuating chamber 51 and the relay/ratio adjustment valve 37a (FIG. 3) is added as a combined entity.

It will be appreciated that the relay/ratio valve 37a may be added to any pulsator of the same general type.

Referring to FIGS. 3 and 4 when atmospheric air pertains to the valve via the connection 47 air flows through passage 38 and via the ball valve 40 lifted thereby, common channel 46 and via channel 45, the needle valve 43, passage 39, chamber 46, through the connecting nozzle 48 to the nozzle 49 giving access through the pulsator cap 50 to the actuating chamber 51 of the driven pulsator to provide free and rapid action of the diaphragm 6. The airflow or pulse thus passed causes a resultant instant vacuum pulse to the teat cups of the driven pulsator.

Conversely, when vacuum pertains to the valve, air being withdrawn immediately closes the ball valve 40 thus compelling all air to pass via passage 39, the adjusting needle valve 43, channel 45, passage 38 to the connection to vacuum 47. Vacuum now pertaining to the actuating chamber of the driven pulsator causes atmosphere to pertain to the attached teat cups.

ADJUSTMENT

To lengthen the vacuum to teat cups phase the withdrawal of air is restricted by closing the ratio needle valve 43 thus prolonging the air phase to the actuating chamber to the desired ratio.

To shorten the vacuum to teat cups phase the ratio needle valve is opened thus accelerating the withdrawal of air from the actuating chamber.

DESCRIPTION OF SLAVE PULSATOR

With the trend to more rapid rates of pulsation combined with increased and increasing vacuum to atmospheric air ratios to promote faster milking of the herd, the time factor in pulsation for the introduction of atmospheric air giving pressure to the teat cups has become progressively shorter and less conducive to cow comfort and well being.

The application of compressed air to pulsators while it would accelerate and increase the pressure cycle, necessitates a pulsator essentially capable of having the ratio of pulsation adjustable to both the air pressure used and the rate of pulsation required otherwise advantage gained could be largely negated by pressure induced ratio imbalance.

The claims defining the invention are as follows:

I claim:

1. A vacuum pulsator adapted to supply pulses of vacuum alternately with non-vacuum pulses, said pulsator comprising a body including means for connecting a first zone of said body to a permanent vacuum source and a diaphragm valve comprising a first valve element cooperating with a first valve seat adapted to connect a second zone of said body to a non-vacuum source of air, said body further including a second valve seat adapted to be opened or closed to establish or prevent communication between said first and second zones, said body further housing a first deformable diaphragm having first and second opposed surfaces, means for alternately applying vacuum and non-vacuum pressures to the second surface of the first deformable diaphragm with said first surface of the first deformable diaphragm arranged for exposure to said permanent vacuum source, said first deformable diaphragm cooperating with said first valve element whereby said first valve element is movable such that when said second valve seat is closed, said first valve seat is open thereby applying non-vacuum air to said second zone, and when said second valve seat is open, said first valve seat is closed thereby applying vacuum to said second zone, the movement of said first deformable diaphragm and said first valve element being controlled by an adjustable ratio control valve means adapted to communicate a continuous restricted flow of non-vacuum air to the second surface of said first deformable diaphragm to control the ratio of vacuum/non-vacuum air in the pulses appearing in said second zone.

2. A vacuum pulsator according to claim 1 wherein said non-vacuum source of air is atmospheric air.

3. A vacuum pulsator according to claim 1 wherein said non-vacuum source of air is compressed air.

4. A vacuum pulsator according to claim 1 wherein said first valve element comprises a second deformable diaphragm secured to said pulsator body.

5. A vacuum pulsator according to claim 4 further including a movable valve member interposed between and cooperating with said second deformable diaphragm and first deformable diaphragm, said valve member including a first seal surface adapted to engage against said second valve seat to close said second valve seat.

6. A vacuum pulsator according to claim 5 wherein said second valve seat is closed prior to said second diaphragm opening, said first valve seat and said second diaphragm closes said first valve seat prior to said second valve seat opening.

7. A vacuum pulsator according to claim 6 wherein said valve member includes a projection adapted to engage and press said second deformable diaphragm against said first valve seat prior to engagement of a second portion of said valve member pressing against said second deformable diaphragm on said first valve seat.

8. A vacuum pulsator according to claim 6 wherein when said valve member is engaged against said second valve seat, a clearance zone is formed above said first valve seat into which said second diaphragm is deformable under action of vacuum in said second zone to open said first valve seat permitting non-vacuum air to flow into said second zone.

9. A vacuum pulsator according to claim 1 wherein said adjustable ratio control valve means includes a first passage leading from said first zone and a second passage leading from the non-vacuum air source, and removable blocking means being provided to selectively close one of said first or second passages.

10. A vacuum pulsator according to claim 9 wherein said first and second passages lead into a common passage communicating with said second surface of said first deformable diaphragm.

11. A vacuum pulsator according to claim 10 wherein adjustable flow restricting means is provided in said common passage.

12. A vacuum pulsator according to claim 1 wherein said means for alternately applying vacuum and non-vacuum pressures to the second surface of the first deformable diaphragm comprises passage means communicating the second zone with the first surface of the first deformable diaphragm.

13. A vacuum pulsator according to claim 12 wherein an adjustable flow restricting valve is provided in said passage means.

14. A vacuum pulsator adapted to supply pulses of vacuum alternately with non-vacuum pulses, said pulsator comprising a body including means for connecting a first zone of said body to a permanent vacuum source and a diaphragm valve comprising a first valve element cooperating with a first valve seat adapted to connect a second zone of said body to a non-vacuum source of air, said body further including a second valve seat adapted to be opened or closed to establish or prevent communication between said first and second zones, said body further housing a first deformable diaphragm having first and second opposed surfaces, means for alternately applying vacuum and non-vacuum pressures to the second surface of the first deformable diaphragm with said first surface of the first deformable diaphragm arranged for exposure to said permanent vacuum source, said first deformable diaphragm cooperating with said first valve element whereby said first valve element is movable such that when said second valve seat is closed, said first valve seat is open thereby applying non-vacuum air to said second zone, and when said second valve seat is open, said first valve seat is closed thereby applying vacuum to said second zone, the movement of said first deformable diaphragm and said first valve element being controlled by an adjustable ratio control valve means adapted to establish restricted continuous communication between vacuum and the second surface of said first deformable diaphragm to control the ratio of vacuum to non-vacuum air in the pulses appearing in said second zone.

15. A vacuum pulsator according to claim 14 wherein said non-vacuum source of air is atmospheric air.

16. A vacuum pulsator according to claim 14 wherein said non-vacuum source of air is compressed air.

17. A vacuum pulsator according to claim 14 wherein said first valve element comprises a second deformable diaphragm secured to said pulsator body.

18. A vacuum pulsator according to claim 14 further including a movable valve member interposed between and cooperating with said second deformable diaphragm and said second deformable diaphragm, said valve member including a first seal surface adapted to engage against said second valve seat to close said second valve seat.

19. A vacuum pulsator according to claim 18 wherein said second valve seat is closed prior to said second diaphragm opening, said first valve seat and said second diaphragm closes said first valve seat prior to said second valve seat opening.

20. A vacuum pulsator according to claim 19 wherein said valve member includes a projection adapted to engage and press said second deformable diaphragm against said first valve seat prior to engagement of a second portion of said valve member pressing against said second deformable diaphragm on said first valve seat.

21. A vacuum pulsator according to claim 19 wherein when said valve member is engaged against said second valve seat, a clearance zone is formed above said first valve seat into which said second diaphragm is deformable under action of vacuum in said second zone to open said first valve seat permitting non-vacuum air to flow into said second zone.

22. A vacuum pulsator according to claim 14 wherein said adjustable ratio control valve means includes a first passage leading from said first zone and a second passage leading from the non-vacuum air source, and removable blocking means being provided to selectively close one of said first or second passages.

23. A vacuum pulsator according to claim 22 wherein said first and second passages lead into a common passage communicating with said second surface of said first deformable diaphragm.

24. A vacuum pulsator according to claim 23 wherein adjustable flow restricting means is provided in said common passage.

25. A vacuum pulsator according to claim 14 wherein said means for alternately applying vacuum ad non-vacuum pressures to the second surface of the first deformable diaphragm comprises passage means communicating the second zone with the first surface of the first deformable diaphragm.

26. A vacuum pulsator according to claim 25 wherein an adjustable flow restricting valve is provided in said passage means.

* * * * *